US012649307B2

(12) United States Patent
Bossan et al.

(10) Patent No.: US 12,649,307 B2
(45) Date of Patent: Jun. 9, 2026

(54) ADHESIVE ASSEMBLY METHOD AND AN ADHESIVE ASSEMBLY OBTAINED BY THE METHOD

(71) Applicant: SAFRAN AIRCRAFT ENGINES, Paris (FR)

(72) Inventors: Pierre Antoine Bossan, Moissy-Cramayel (FR); Sophie Essayan, Moissy-Cramayel (FR); Allison Glugla, Moissy-Cramayel (FR); Jordan Kusch, Moissy-Cramayel (FR); Benjamin Samson, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/903,734

(22) Filed: Oct. 1, 2024

(65) Prior Publication Data

US 2025/0115040 A1      Apr. 10, 2025

Related U.S. Application Data

(62) Division of application No. 17/618,182, filed as application No. PCT/EP2020/066904 on Jun. 18, 2020, now Pat. No. 12,134,258.

(Continued)

(51) Int. Cl.
| | | |
|---|---|---|
| *B32B 7/12* | (2006.01) | |
| *B29C 65/00* | (2006.01) | |
| *B29C 65/48* | (2006.01) | |
| *B29C 65/50* | (2006.01) | |
| *B29C 65/52* | (2006.01) | |
| *B32B 7/06* | (2019.01) | |

(Continued)

(52) U.S. Cl.
CPC ...... *B32B 37/1284* (2013.01); *B29C 65/4805* (2013.01); *B29C 65/5057* (2013.01); *B29C 65/52* (2013.01); *B29C 66/721* (2013.01); *B29C 66/742* (2013.01); *B32B 7/06* (2013.01); *B32B 7/12* (2013.01); *B32B 15/08* (2013.01); *B32B 27/20* (2013.01); *B29L 2031/082* (2013.01); *B32B 2603/00* (2013.01)

(58) Field of Classification Search
CPC ......... F05D 2240/303; Y10T 428/2419; Y10T 428/24231; Y10T 428/24198
See application file for complete search history.

(56) References Cited

U.S. PATENT DOCUMENTS

| | | |
|---|---|---|
| 2011/0135887 A1 | 6/2011 | Saff et al. |
| 2013/0004323 A1 | 1/2013 | Hansen et al. |
| | (Continued) | |

FOREIGN PATENT DOCUMENTS

WO      WO 2007/093636 A1      8/2007

OTHER PUBLICATIONS

International Search Report as issued in International Patent Application No. PCT/EP2020/066904, dated Nov. 3, 2020.

(Continued)

*Primary Examiner* — Scott W Dodds
(74) *Attorney, Agent, or Firm* — CUSHMAN PARTNERS LLC

(57) ABSTRACT

An adhesively bonded assembly of a first substrate on a second substrate by means of an adhesive joint integrating a support mesh, wherein the support mesh is present after curing over the entire adhesively bonded zone between the first and second substrates.

6 Claims, 2 Drawing Sheets

Related U.S. Application Data

(60) Provisional application No. 62/863,522, filed on Jun. 19, 2019.

(51) Int. Cl.

| | | |
|---|---|---|
| *B32B 15/08* | (2006.01) | |
| *B32B 27/20* | (2006.01) | |
| *B32B 37/12* | (2006.01) | |
| B29L 31/08 | (2006.01) | |

(56) References Cited

U.S. PATENT DOCUMENTS

| | | |
|---|---|---|
| 2013/0220537 A1 | 8/2013 | Parkin |
| 2013/0239586 A1 | 9/2013 | Parkin et al. |
| 2014/0030105 A1 | 1/2014 | Fameau et al. |
| 2014/0327433 A1 | 11/2014 | Anway et al. |
| 2016/0107742 A1 | 4/2016 | Vichniakov et al. |
| 2016/0201505 A1 | 7/2016 | Clarkson et al. |

OTHER PUBLICATIONS

First Office Action as issued in Chinese Patent Application No. 202080045117.5, dated Apr. 12, 2023.

Zhang, Y., et al., "High-Technologies Composite Material Preparation Handbook," National Defense Industry Press, (Year: 2003), pp. 289-292.

ADHESIVE ASSEMBLY METHOD AND AN ADHESIVE ASSEMBLY OBTAINED BY THE METHOD

CROSS-REFERENCE TO RELATED APPLICATIONS

This application is a divisional of U.S. Ser. No. 17/618,182 filed Dec. 10, 2021, which is the U.S. National Stage of PCT/EP2020/066904, filed Jun. 18, 2020, which in turn claims priority to U.S. provisional patent application No. 62/863,522 filed Jun. 19, 2019. The content of these applications are incorporated herein by reference in their entireties

FIELD

The field of the invention is that of bonding an adhesive film on a support, and more particularly that of bonding metal structural reinforcement on the leading edges of aircraft turbine engine fan blades made of fiber-reinforced organic matrix composite material.

BACKGROUND

FIG. 3 shows a prior art adhesively bonded assembly 30 comprising a first substrate 32 and a second substrate 34 joined together by a joint 36 of epoxy adhesive. As shown in the associated detail view, the adhesive joint or film contains a nylon support mesh (or screen or grille) 38 integrated in the film of raw adhesive and serving to calibrate the thickness of the joint during polymerization in an autoclave while the viscosity of the epoxy becomes, temporarily, very low (reference 40 represents a vacuum bag subjected to the pressure of the autoclave as represented by arrows 42, and reference 44 represents the orifice for evacuating the bag). The assembly made in this way comprising epoxy adhesive and a thermoplastic polymer constituted by nylon, presents great capacity for absorbing energy due to various shocks and impacts, the support mesh guaranteeing a certain minimum thickness for the adhesive after it has polymerized (cured).

Nevertheless, with certain adhesives, and in particular with the above-mentioned adhesive, a phenomenon is observed of the support mesh shrinking during curing, which leaves the adhesive without any support mesh at the end 46 of the adhesively bonded zone, thereby no longer guaranteeing the minimum thickness in that zone. The absence of support mesh at the ends of the adhesive zone also causes the mechanical properties of the adhesive joints to be changed locally, and that can have harmful consequences.

In particular, with fan blades, this absence of support mesh under the ends of the metal structural reinforcement acts during impacts against foreign bodies to facilitate separation that can subsequently propagate more widely under the entire metal structural, with the presence of the support mesh also having a considerable influence on the propagation of such separations in the adhesive joint.

Such separations can then continue to propagate under vibratory fatigue loading, giving rise to risks of delamination, of fibers breaking, or indeed of damage by loss of cohesion between fibers and the matrix, making it necessary to repair the blade or even to replace it during a maintenance operation, thereby having a major impact on the availability of the aircraft.

SUMMARY

In this context, the invention seeks to mitigate the above-mentioned drawbacks of present adhesively bonded assemblies by proposing an adhesively bonded assembly obtained with a novel method that enables separations to be eliminated at the ends of the adhesively bonded portions. An object of the invention is also to provide a method that is simple to implement and that is as close as possible to the present method.

These objects are achieved by a method of adhesively bonding a first substrate on a second substrate in an adhesive bonding zone by means of an adhesive joint integrating a support mesh, wherein a surplus adhesive joint is folded over onto one or the other of the first or second substrates so that the support mesh is present over the entire adhesively bonded zone after curing.

It is thus possible to guarantee a minimum thickness for the adhesive over the entire adhesively bonded zone while maintaining the properties of an adhesive joint. Likewise, after curing (polymerizing if the adhesive is epoxy), trimming the excess adhesive is made easier.

Preferably, the retention of the folded-over surplus adhesive joint is strengthened by mechanical pressure from a vacuum bag or from an appropriate retention fixture.

Advantageously, the surplus adhesive joint beyond the adhesive bonding zone has a length of less than 20 millimeters (mm).

Preferably, the surface of the first or second substrates that is to receive the surplus adhesive joint is previously prepared to facilitate eliminating that surplus.

Advantageously, the surface of the substrate that is to receive the surplus adhesive joint is prepared by depositing a peel-off fabric or an adhesive tape made of Teflon on at least a portion of the surface of the substrate in question.

Preferably, the adhesive is an epoxy adhesive and the support mesh is a mesh made of nylon or of elastomer.

Advantageously, the first substrate is metal structural reinforcement and the second substrate is a leading edge of an aircraft turbine engine fan blade made of fiber reinforced organic matrix composite material.

The invention also provides an assembly obtained by the method and made up of a first substrate adhesively bonded on a second substrate by an adhesive joint integrating a support mesh, wherein the support mesh does not have any shrinkage over the entire adhesively bonded zone between the first and second substrates.

Finally, the invention provides an aircraft turbine engine fan blade including an adhesively bonded assembly.

BRIEF DESCRIPTION OF THE DRAWINGS

Other characteristics and advantages of the present invention appear from the following description made with reference to the accompanying drawings, which show an implementation having no limiting character, and in which.

DETAILED DESCRIPTION

Figure 1:
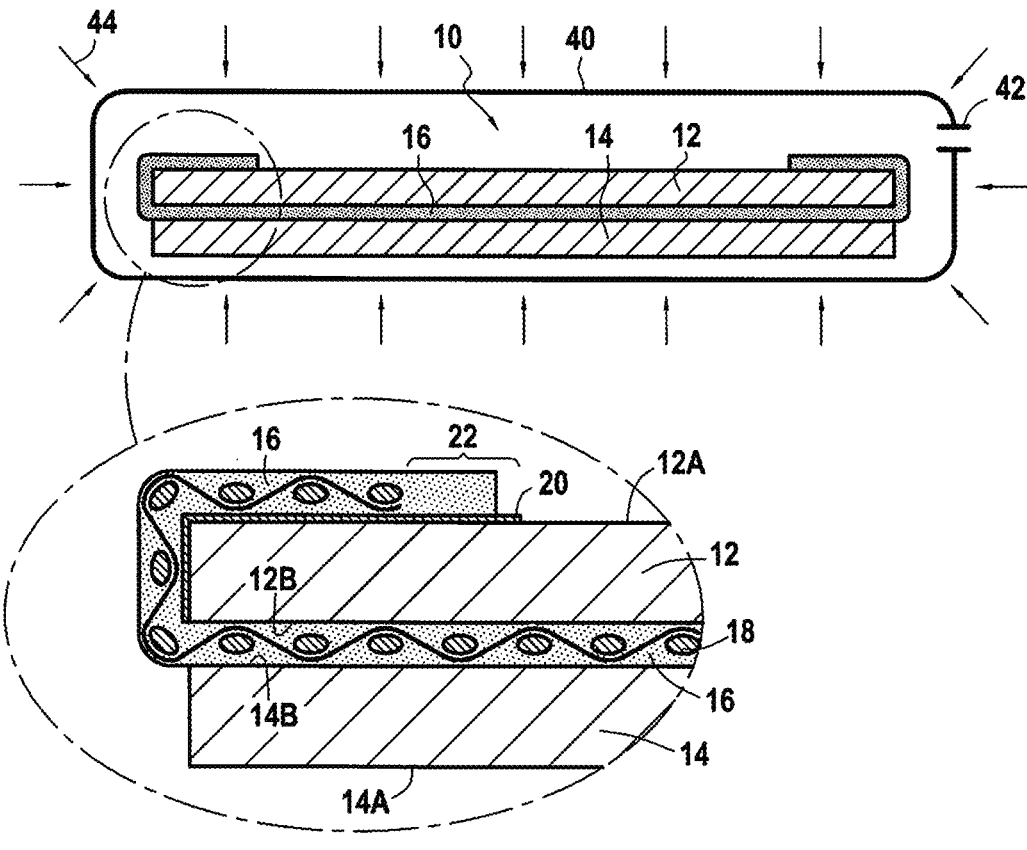
FIG. 1 is a simplified diagram with a detail view showing an adhesively bonded assembly in accordance with the invention in its vacuum bag.

FIG. 1 shows an adhesively bonded assembly in accordance with the invention arranged in its vacuum bag 40 that is to be subjected to pressure (arrows 44) from the autoclave. This assembly 10 of a first substrate 12 on a second substrate 14 by means of an adhesive joint 16 integrates a support mesh 18, as described above with reference to FIG. 1. The first substrate has an outer surface 12A and an inner surface 12B, and the second substrate also has an outer surface 14A and an inner surface 14B, these two substrates being bonded together via their inner surfaces.

The assembly of the invention differs from prior art assemblies in that the adhesive joint that is in the form of an adhesive film is folded over one of the two substrates (the first substrate 12 in the example shown, but that should not be considered as being limiting), with the film being held against the outer surface 12A by the adhesive joint itself, with this being strengthened by the mechanical pressure from the vacuum bag 40 in the event of curing in an autoclave or by pressure from an appropriate retention fixture (not shown) when the adhesive is used cold outside an autoclave.

This folding is advantageously performed over a length of substrate that is typically less than 20 mm. The adhesive is typically an epoxy adhesive and the support mesh is a mesh of nylon or of elastomer.

Once the adhesive has set cold or has been cured in the autoclave, the surplus adhesive joint on the adhesively bonded assembly can then be eliminated. This elimination is made easier by the fact that the outer surface 12A of the first substrate is previously prepared by adding an adhesive tape made of Teflon or a peel-off fabric 20 at least over the portion that is to receive the surplus.

Figure 2:
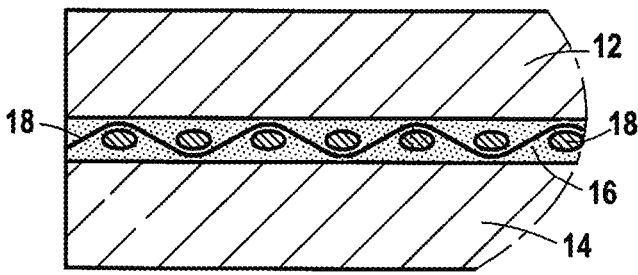
FIG. 2 shows the adhesively bonded assembly once the surplus adhesive joint has been eliminated.
Figure 3:
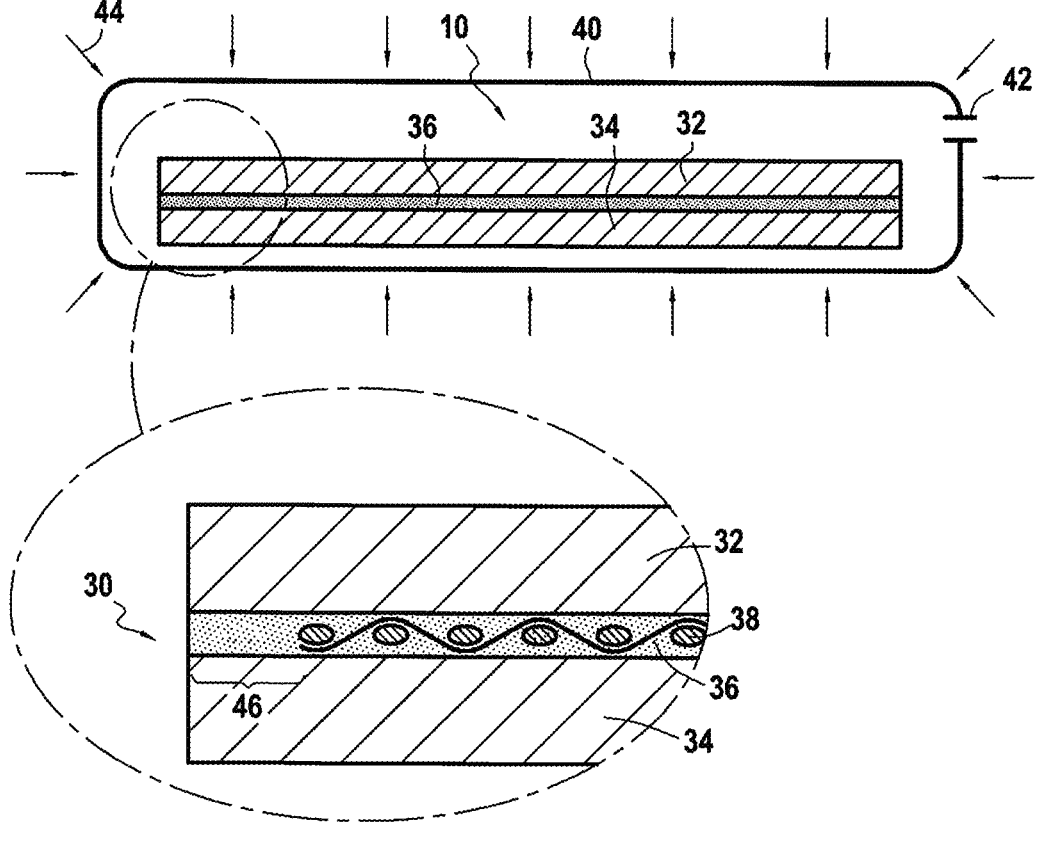
FIG. 3 shows a prior art adhesively bonded assembly in its vacuum bag.

As shown in FIG. 2, which shows the adhesively bonded assembly once the surplus adhesive joint has been removed, folding the adhesive joint over the outer surface of the substrate in this way serves to guarantee that support is present over the entire adhesively bonded zone between the two substrates, with the shrinkage zone 22 in the support mesh thus being offset beyond the adhesively bonded zone, to the end of the adhesive joint in its portion that is thus eliminated.

As a result of multiple tests with various types of support mesh and cutting up parts, the inventors have also been able to show that the surplus adhesive joint folded over onto the substrate has no impact on the distribution of pressure during curing and is therefore not of a nature that might reduce the final mechanical properties of the adhesive bonding.

A particular application to the invention lies in aircraft turbine engine fan blades, and more precisely in adhesively bonding metal structural reinforcement onto the leading edges of such fan blades, which are themselves made of fiber reinforced organic matrix composite material, given that such edges are greatly stressed in the event of impacts against objects. It is therefore essential to guarantee the quality of the adhesive bonding of the reinforcement, and this is well ensured by the invention.

The invention claimed is:

1. An intermediate adhesively bonded assembly prior to curing, comprising:
   a first substrate having an inner surface and an outer surface;
   a second substrate having an inner surface and an outer surface;

a curable, uncured adhesive joint disposed between the inner surface of the first substrate and the inner surface of the second substrate in an adhesive bonding zone, the adhesive joint integrating a support mesh;
   a peel-off fabric or an adhesive tape made of Teflon deposited on at least a portion of the outer surface of the first substrate or the outer surface of the second substrate;
   wherein a surplus portion of the adhesive joint extends beyond an edge of the adhesive bonding zone and is folded over onto the peel-off fabric or the adhesive tape made of Teflon; and
   wherein the peel-off fabric or the adhesive tape made of Teflon is configured to facilitate release of the surplus portion of the adhesive joint after the adhesive joint is cured.

2. The intermediate adhesively bonded assembly prior to curing according to claim 1, wherein an adhesive of the adhesive joint is an epoxy adhesive and the support mesh is a mesh made of nylon or of elastomer.

3. The intermediate adhesively bonded assembly prior to curing according to claim 1, wherein the first substrate is metal structural reinforcement and the second substrate is a leading edge of an aircraft turbine engine fan blade made of fiber reinforced organic matrix composite material.

4. An intermediate adhesively bonded assembly after curing and prior to removal of a surplus portion of an adhesive joint, comprising:
   a first substrate having an inner surface and an outer surface;
   a second substrate having an inner surface and an outer surface;
   the inner surface of the first substrate adhesively bonded to the inner surface of the second substrate in an adhesive bonding zone by a cured adhesive joint that integrates a support mesh over the entire adhesive bonding zone;
   a peel-off fabric or an adhesive tape made of Teflon deposited on at least a portion of the outer surface of the first substrate or the outer surface of the second substrate;
   wherein a surplus portion of the cured adhesive joint extends beyond an edge of the adhesive bonding zone and is folded over onto the peel-off fabric or the adhesive tape made of Teflon; and
   wherein the peel-off fabric or the adhesive tape made of Teflon is configured to facilitate release of the surplus portion of the cured adhesive joint.

5. The intermediate adhesively bonded assembly after curing and prior to removal of a surplus portion of an adhesive joint according to claim 4, wherein an adhesive of the cured adhesive joint is an epoxy adhesive and the support mesh is a mesh made of nylon or of elastomer.

6. The intermediate adhesively bonded assembly after curing and prior to removal of a surplus portion of an adhesive joint according to claim 4, wherein the first substrate is metal structural reinforcement and the second substrate is a leading edge of an aircraft turbine engine fan blade made of fiber reinforced organic matrix composite material.

* * * * *